United States Patent [19]

Kozak et al.

[11] 4,451,591

[45] May 29, 1984

[54] TWO-COMPONENT HIGH SOLIDS COATING FOR RUSTY STEELS

[75] Inventors: Henry A. Kozak, Edison; Tony Y. Liu, East Windsor, both of N.J.

[73] Assignee: Mobil Oil Corporation, New York, N.Y.

[21] Appl. No.: 388,836

[22] Filed: Jun. 16, 1982

[51] Int. Cl.$^3$ .............................................. C08L 63/02
[52] U.S. Cl. .................................. 523/177; 523/439; 523/457; 523/465
[58] Field of Search .................. 523/439, 177, 457; 524/906; 428/418

[56] References Cited

U.S. PATENT DOCUMENTS

| | | | |
|---|---|---|---|
| 2,987,492 | 6/1961 | Pinder | 260/23 |
| 3,007,888 | 11/1961 | Mack et al. | 260/37 |
| 3,183,198 | 5/1965 | Wagner | 523/177 |
| 3,408,318 | 10/1968 | Madison | 260/18 |
| 3,427,190 | 2/1969 | Murdock | 523/177 |
| 4,342,674 | 8/1982 | Morgan | 523/177 |

FOREIGN PATENT DOCUMENTS

| | | | |
|---|---|---|---|
| 45-15634 | 6/1970 | Japan | 523/457 |
| 1055504 | 1/1967 | United Kingdom . | |
| 2075022 | 11/1981 | United Kingdom . | |
| 569148 | 5/1978 | U.S.S.R. | 523/457 |

OTHER PUBLICATIONS

"Carbomastic 15" Product Data Sheet, Carboline Co., Jan., 1980.
"DMP Dimethylaminomethylphenols" Technical Bulletin, Rohm and Haas Co., Jun., 1980.
"Epoxy Curing Agents, Genamid 747" Technical Bulletin, Henkel Corporation.
Chemical Abstracts; vol. 85, No. 18; No. 125939z.

*Primary Examiner*—Lewis T. Jacobs
*Attorney, Agent, or Firm*—Alexander J. McKillop; Michael G. Gilman; James P. O'Sullivan, Sr.

[57] ABSTRACT

This invention provides a two-component coating composition wherein:

Component A contains a liquid polyglycidyl ether of a bisphenol having an epoxy equivalent weight between about 170 and about 200; an aluminum paste and optionally, a thixotropic agent; a coumarone-indene resin and/or silica gel; and Component B contains a fatty acid polyamide; a fatty acid diamine salt; and, optionally, a coumarone-indene resin, microcrystalline silica; 2,4,6-tris-(dimethylaminomethyl) phenol; zinc phosphate and/or talc.

3 Claims, No Drawings

TWO-COMPONENT HIGH SOLIDS COATING FOR RUSTY STEELS

BACKGROUND OF THE INVENTION

1. Field of the Invention

This invention is directed to a two-component epoxy-polyamide based high solids coating composition for rusty steels.

2. Description of the Prior Art

Some alkyds and other oil modified products have been formulated for application over rusty steel, but these products will not withstand exposure in a heavy industrial environment. Zinc based amidoamine-containing protective coatings for ferrous metals are disclosed in Ginsberg; U.S. Pat. No. 4,084,971; issued Apr. 18, 1978. A two-component aluminum epoxy mastic composition said to be useful for protection of rusty steel surfaces is commercially marketed under the tradename "Carbomastic 15" by Carboline Company. An especially effective two-component coating composition suitable for rusty steels is described and claimed in U.S. Pat. No. 4,342,674, issued Aug. 3, 1981.

It is an object of the present invention to provide two-component coating compositions similar to those of U.S. Pat. No. 4,342,674 but having improved pot life and corrosion resistance.

SUMMARY OF THE INVENTION

This invention provides a two-component coating composition comprising a Component A and a Component B.

Component A essentially contains a liquid polyglycidyl ether of a bisphenol, having an epoxy equivalent weight between about 170 and about 200; and a leafing or non-leafing aluminum paste. Component B essentially contains a fatty acid polyamide resin, and a fatty acid diamine salt. Either Component A or Component B or both must also essentially contain a coumarone-indene resin having a softening point between about 40° F. and about 60° F. Components A and/or Component B can optionally contain thixotropic agents, moisture scavengers, fillers such as microcrystalline silica and talc and anticorrosive pigments. The Component B mixture can also optionally contain supplemental amine-based curing agents and accelerators.

The present invention also relates to coating compositions of this type which can be thinned with aromatic hydrocarbon solvent. The invention further relates to rusty steel substrates coated with such compositions.

DETAILED DESCRIPTION OF THE INVENTION

The coating compositions of this invention comprise two components which are mixed just prior to application. Substantially equal volumes of each component can be mixed and thinned with aromatic hydrocarbon solvent to form a coating composition which can then be applied to a ferrous metal substrate.

Component A

One essential ingredient in Component A is a liquid polyglycidyl ether of a bisphenol, having an epoxy equivalent weight between about 170 and about 200. Preferred materials of this type are epoxy resins which are diglycidyl ethers of bisphenol A (DGEBA), having an epoxy equivalent weight of from about 185 to 192. Materials of this type are readily available commercially in undiluted form and are sold under such tradenames as "EPON", e.g., "EPON 828", marketed by Shell.

Another essential ingredient of the Component A mixture is leafing or non-leafing aluminum paste. Such materials are readily available commercially. A preferred paste is a leafing paste which contains about 68 weight percent aluminum flakes admixed with about 32 weight percent of a mixture by volume of 92% aliphatic hydrocarbon (B.R. 150°–180° C.) and 8% aromatic hydrocarbon (B.R. 150°–175° C.).

An essential ingredient of the total composition which may be used as another ingredient of the Component A mixture is a coumarone-indene resin. Coumarone-indene resins are also commercially available. Preferably, this resin has a softening point between about 40° F. (about 4.4° C.) and about 60° F. (about 15° C.), most preferably about 50° F.

In addition to the foregoing ingredients, Component A of the compositions herein can additionally contain a number of optional ingredients which serve to improve the characteristics or performance of the coating compositions herein. One such optional ingredient of the Component A mixture is a thixotropic agent. Such agents are those organic or inorganic materials which tend to impart thixotropic properties to the Component A mixture. Organic thixotropic agents can include waxes which can be hydrocarbons, ethers of fatty acids and alcohols, ethylene polymers (e.g., Carbowax) or polyol ether-esters. A preferred organic thixotropic agent is castor wax, e.g., hydrogenated castor oil, which is commercially available at 24% solids in mineral spirits (B.R. about 155°–195° C.). Inorganic thixotropic agents include commercially available clay materials such as smectites, attapulgites, bentonites and the like marketed under such tradenames as Bentone, Thixogel, Barasym and the like.

Another optional ingredient which can be included in Component A of the compositions herein is a moisture scavanging agent such as silica gel to substantially reduce any moisture contamination carried into the mixture with the other ingredients. Silica gels are available commercially and can be obtained under the tradename "Syloid".

The foregoing ingredients can be admixed in any order to form the Component A of the coating compositions herein. Concentrations of such materials which may be utilized are set forth as follows:

| Ingredient | Concentration (wt. %) | |
|---|---|---|
| | Preferred | More Preferred |
| Undiluted Liquid Epoxy Resin | 50–80 | 55–70 |
| Thixotropic Agent | 0.01–2.0 | 0.05–1.0 |
| Coumarone-Indene | 3–25 | 4–10 |
| Aluminum Paste | 25–35 | 28–32 |
| Moisture Scavenger | 0.1–2 | 0.5–1.5 |

It has been discovered that by employing the particular ingredients hereinbefore described, preferably in the concentrations set forth, formulation of the Component A mixture can be simplified in comparison with the Component A mixture of U.S. Pat. No. 4,342,674, which relates to similar two-component coating compositions. By using the particular epoxy resin specified for use in the instant Component A mixture in undiluted liquid form, it is not necessary to utilize either the diluent for the epoxy resin, the urea-formaldehyde flow control agent or the 2-nitropropane solvent which are essential ingredients in the Component A mixture of the U.S. Pat. No. 4,342,674 coating compositions. Component A of the instant compositions can thus be substantially free of reactive diluents, urea-formaldehyde and 2-nitropropane without adversely affecting properties of the coating compositions of the present invention.

Component B

One essential ingredient of Component B of the compositions herein is a fatty acid polyamide resin. Fatty acid polyamide resins are the reaction product of mono-, di- or tri-basic fatty acids with an alkenyl polyamine. Such materials are commercially available under a variety of tradenames. One useful type of polyamide is prepared from diethylenetriamine and a mixture of 75% dimer fatty acid (linoleic) and 25% mono/trimer fatty acid (linolenic), the resin having a base number between about 300 and about 360. Polyamide resins of this type are commercially marketed under the Tradename Versamid.

A preferred type of polyamide resin for use in Component B are the fatty acid amidoamines formed by the reaction of a monobasic fatty acid and an alkenyl polyamine. Preferably, ethylenically unsaturated fatty acids are usually reacted with excess amounts of an alkenyl polyamine containing two primary amine groups and at least one secondary amine group whereby acid amines are obtained. Exact stoichiometric amounts of these reactants are not necessary.

A preferred fatty acid amidoamine is prepared by the interaction of linoleic or eleostearic acid with an alkylene polyamine such as diethylenetriamine, triethylenetetramine, dimethylaminopropylene, diethylaminopropylene, tetraethylenepentamine, and the like. These alkenyl polyamines have the formula:

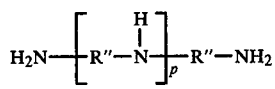

wherein R'' is an alkylene group having 2 to about 5 carbon atoms inclusive and p is an integer having values of 1 to about 5 inclusive. Such fatty acid amidoamines are available commercially under the tradename "Genamid", e.g., Genamid 2000, 250 and 747 from General Mills Chemicals Inc. and "Araldite 955" supplied by Ciba Company.

Modified fatty acid amidoamines can also be used as the polyamide resin ingredient in the Component B mixtures. Such modified amidoamines can include the polyamide adducts disclosed in Preston; U.S. Pat. No. 3,900,437; Issued Aug. 19, 1975, which is incorporated herein by reference. These are obtained by the interaction of: (a) an amine component having the formula:

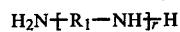

wherein $R_1$ is an aromatic group containing 6 to 10 carbon atoms or an alkylene group containing 2 to 4 carbon atoms and r is an integer having values from 1 to 5;

(b) a monoepoxide component selected from monoepoxide having the formula:

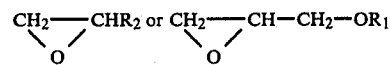

wherein $R_2$ is hydrogen, phenyl or alkyl having 1 to 10 carbons and $R_3$ is phenyl or alkyl having 1 to 10 carbon atoms; and (c) an acid component selected from monomeric, aliphatic, unsaturated monocarboxylic fatty acids containing 16 to 22 carbon atoms or polymeric fatty acids containing 32 to 44 carbon atoms. Products of this type are commercially available under the tradename Genamid 788 from General Mills Chemicals, Inc.

Another essential ingredient of the Component B mixture is a fatty acid diamine salt useful as a wetting agent and corrosion inhibitor. Such materials are the reaction product of a fatty acid amine and a fatty acid. Examples of such material include N-tallow-1,3-propane diamine monooctadecenoate and N-tallow-1,3-propane diamine dioctadecanoate. Such fatty acid diamine salts are marketed under the tradename, "Duomeen."

Component B can also contain a coumarone-indene resin of the type described above with respect to Component A. The coumarone-indene resin can be used in either Component A only, in Component B only or, preferably in both Component A and Component B. It is essential, however, that at least some coumarone-indene resin be present in the coating compositions formed by the admixture of Component A and Component B. Preferably the amount of coumarone-indene resin comprises from about 3 to 10% by weight of the combined Component A and Component B mixtures.

Component B can also contain a thixotropic agent as an optional ingredient. The thixotropic agents which can optionally be utilized in Component B are the same as those hereinbefore described with respect to Component A.

Another optional ingredient of Component B is an inert particulate filler material useful for building solids content and improving the rheological properties of the Component B mixture. Filler materials of this type include microcrystalline silica and magnesium silicate (talc). A preferred Component B mixture contains both microcrystalline silica having an average particle size of about 8.5 microns and magnesium silicate which is commercially available under the tradename Microtalc.

Another optional ingredient of Component B is a supplemental amine-based curing agent or curing accelerator. Examples of agents of this type include dimethylaminomethylphenol and 2,4,6-tris(dimethylaminomethyl) phenol. Such materials are commercially marketed under the respective tradenames DMP-10 and DMP-30 by the Rohm and Haas Company.

Another optional ingredient of Component B is a corrosion inhibitive pigment. Materials of this type are conventional and are known in the art. Zinc phosphate and zinc chromate are examples of corrosion inhibitive pigments which can be employed.

The foregoing ingredients can be admixed in any convenient order to form the Component B of the coating compositions herein. Concentrations of such materials which may be utilized are set forth as follows:

| Ingredient | Concentration (wt. %) | |
|---|---|---|
| | Preferred | More Preferred |
| Fatty Acid Polyamide Resin | 30–45 | 36–40 |
| Fatty Acid Diamine Salt | 3–6 | 3.5–4.5 |
| Thixotropic Agent | 0.1–2 | 0.1–1 |
| Coumarone-Indene Resin | 3–25 | 4–10 |
| Inert Particulate Filler (Total) | 33–56 | 40–53 |
| Microcrystalline Silica | 25–40 | 30–38 |
| Magnesium Silicate | 8–16 | 10–15 |
| Anticorrosive Pigment | 1–6 | 1.5–4.5 |
| Supplemental Curing Agent | 0.5–3 | 1–2 |

Coating Composition Formulation

At the time of application, Component A and Component B are mixed in a volume ratio of from about 2:1 to 1:2 and preferably in substantially equal volumes to form the coating compositions of the present invention. Such compositions can be thinned with xylene or other non-reactive aromatic hydrocarbons (substituted or unsubstituted) for application. A preferred formulation contains, by volume, about 40 percent Component A, about 40 percent Component B, and about 20 percent xylene. Prior to mixing, each component is packaged separately.

The coating composition of this invention are particularly suitable for coating rusty steel surfaces, where sandblasting is prohibited or impractical. The surface can be satisfactorily cleaned using hand or power wire brushing. Typical uses include structures in coastal or industrial environments, bridges deteriorating because of deicing salts, paper machine room applications, and other exposures subject to fume conditions or high humidity or moisture condensation. Such compositions also can be used for coating weathered galvanized siding, roofing, and fencing. The compositions are self-priming and can be used as such for general maintenance coating; but, when there is exposure to strongly acidic or alkaline environments, the coating should be topcoated with a suitable epoxy, vinyl, chlorinated rubber, or urethane coating.

The preferred method of application is by spraying. Brush or roller application can be used, but brush marks and lap marks will be visible. Application should be sufficient to provide a dry film thickness of 5–8 mils (about 7–11 mils wet). The coating is dry to touch 4 hours after application at room temperature and tack free in 12–24 hours. A drying time in air of at least 24 hours should be permitted if a topcoat is to be used.

By formulating coating compositions in the foregoing manner using the particular ingredients hereinbefore described, it is possible to provide coating compositions which have improved corrosion resistance, pot life, shelf life and appearance in comparison with similar compositions as described in U.S. Pat. No. 4,342,674, issued Aug. 3, 1982. Such compositions embodied in this prior application are hereinafter referred to as the "Morgan" compositions.

The coating compositions of the present invention are substantially anhydrous. Furthermore, they need not contain solvents or other materials which are irritating or troublesome to package or ship. Thus, for example, unlike some coating products of the same general type, the coating compositions herein can be substantially free of irritating ingredients, e.g., phenol.

The coating compositions of the present invention and their effectiveness for protection of steel surfaces are illustrated by the following examples.

EXAMPLE 1

Preparation of the Instant Coating Composition

In a drum, there were added 110 pounds of liquid diglycidyl ether of bisphenol A, having an epoxy equivalent weight of 185–192, 6 pounds of Syloid AL-1 silica gel and 7 pounds of organic wax (24% solids in mineral spirits)*. This mixture was mixed at high speed for 30 minutes. The mixture was transferred to a mixing vessel and there were added 529 pounds of additional liquid diglycidyl ether of bisphenol A, having an epoxy equivalent weight of 185–192, 64 pounds of coumarone-indene resin (softening point about 50° F.), and 323 pounds leafing aluminum paste (68% solids aluminum flakes in mixture with 92% aliphatic hydrocarbon, B.R. 150°–180° C., and 8% aromatic hydrocarbon, B.R. 150°–175° C., by volume). Mixing was continued until the mixture was smooth. This component contained 89.6 weight percent solids.
*MPA 60, NL Industries.

Component B

In a mixing vessel, there was added 438 pounds fatty acid amidoamine resin (Genamid 747), 50.0 pounds N-tallow-1,3-propylenediamine dioleate, 76 pounds of coumarone-indene resin (softening point about 50° F.) and 10 pounds of organic wax (24% solids in mineral spirits)* and mixing was continued for 20 minutes. Then, 147 pounds of magnesium silicate, 397 pounds of microcrystalline silica (average particle size 8.5 microns) and 34 pounds of zinc phosphate were added. The resultant mixture was ground to Hegman NS-3. When the grind was Hegman NS-3, there were added 15.0 pounds of 2,4,6-tris-(dimethylaminomethyl) phenol and mixing was continued for 10 minutes. This component contained 99.4 weight percent solids.
*MPA 60, NL Industries Coating Composition There were mixed 40 volumes of Component A, 40 volumes of Component B, and 20 volumes of xylene. The resultant composition had a solids content of about 81.4 weight percent and a pot life of about 3½ hours at 75° F. It set in air, after application, dry to touch after 4 hours and tack free after 24 hours.

EXAMPLE 2 (Comparative)

Preparation of Morgan Coating Composition

Component A

In a drum, there were added 104 pounds of diglycidyl ether of bisphenol A, having an epoxy equivalent weight of 175–195, dissolved in 11% butyl diglycidyl ether and 6.7 pounds of organic wax (24% solids in mineral spirits)*. This mixture was mixed at high speed with a Hockmeyer mixer for 30 minutes. The mixture was transferred to a mixing vessel, and there were added 511.7 pounds of diglycidyl ether of bisphenol A having an epoxy equivalent weight of 185–192, 62.4 pounds of coumarone-indene resin (softening point about 50° F.), 20.0 pounds urea-formaldehyde resin (50% solids in a mixture of 80 volume % n-butanol and 20 volume % ethylbenzene, and 312.0 pounds leafing aluminum paste (68% solids aluminum flakes in mixture with 92% aliphatic hydrocarbon, B.R. 150°–180° C., and 8% aromatic hydrocarbon, B.R. 150°-175° C., by volume). Mixing was continued until the mixture was smooth. Then 11.2 pounds 2-nitropropane was added and mixing was continued until mixing was uniform. This component contained 87.8 weight percent solids.
*MPA 60, NL Industries.

Component B

In a mixing vessel, there were added 428.9 pounds polyamide resin (diethylenetriamine—75% dimer/25% trimer linoleic acid having a base number of about 330), 50.0 pounds N-oleyl-1,3-propylenediamine oleate, and 76.2 pounds of coumarone-indene resin (softening point about 50° F.). The mixture was mixed at high speed for 15 minutes. Then, there was added 6.8 pounds of organic wax (24% solids in mineral spirits)* and mixing was continued for 30 minutes. Then, 571.6 pounds of microcrystalline silica (average particle size 8.5 microns) were added. The resultant mixture was ground to Hegman NS-3. When the grind was Hegman NS-3, there was added 15.0 pounds of 2,4,6-tris-(dimethylaminomethyl)-phenol and mixing was continued for 15 minutes. This component contained 99.85 weight percent solids.
*MPA 60, NL Industries.

Coating Composition Formulation

There were mixed 40 volumes of Component A, 40 volumes of Component B, and 20 volumes of xylene. The resultant composition had a solids content of about 80.91 weight percent and a pot life of about 3 hours at 70° F. It set in air, after application, dry to touch after 4 hours and hard after 24 hours.

EXAMPLE 3

Pot Life at Room Temperature

The composition of the instant invention (Example 1) and the Morgan composition (Example 2) are compared for pot life at room temperature (75° F./27.9° C.). Results are shown as follows:

|  | 1 Gallon | 5 Gallons |
| --- | --- | --- |
| Instant Composition | 6 hours | 3½ hours |
| Morgan Composition | 5 hours | 2¾ hours |

EXAMPLE 4

Salt Spray Resistance

Sand blasted steel panels and wirebrushed rusty steel panels are topcoated at 5 mils dry film thickness with the thinned mixtures of Examples 1 and 2. The coated panels are subjected to salt spray for up to 4000 hours. Results of the salt spray exposure testing are set forth in Table I.

TABLE I

| | SALT SPRAY EXPOSURE | | | |
| --- | --- | --- | --- | --- |
| | SANDBLASTED STEEL | | RUSTY STEEL | |
| | | | Example 1 | Example 2 |
| | Example 1 | Example 2 | (Instant | (Morgan |
| | (Instant | (Morgan | Composi- | Composi- |
| HOURS | Composition) | Composition) | tion) | tion) |
| 500 | NE | NE | NE | NE |
| 1000 | NE | NE | NE(8VF) | NE(8F) |
| 1500 | NE | NE(6F) | NE(8VF) | NE(8F) |
| 2000 | NE | 8F(6M) | NE(8M) | NE(6M) |
| 2500 | NE | 8F(4M) | NE(6MD) | NE(6D) |
| 3000 | NE(8F) | 4D(2D) | NE(6MD) | 6MF(2D) |

TABLE I-continued

| | SALT SPRAY EXPOSURE | | | |
| --- | --- | --- | --- | --- |
| | SANDBLASTED STEEL | | RUSTY STEEL | |
| | | | Example 1 | Example 2 |
| | Example 1 | Example 2 | (Instant | (Morgan |
| | (Instant | (Morgan | Composi- | Composi- |
| HOURS | Composition) | Composition) | tion) | tion) |
| 3500 | NE(6M) | 2D(2D) | NE(6D) | 6MF(2D) |
| 4000 | NE(2D) | 2D(2D) | NE(4D) | 6M(2D) |

Ratings:
Frequency of Blisters
NE = No effect
VF = Very few
F = Few
MF = Medium few
M = Medium
MD = Medium dense
D = Dense
( ) = Rating in parenthesis pertains to scribes only
Size of Blisters
8 = About 1/32" in diameter
6 = About 1/16" in diameter
4 = About ⅛" in diameter
2 = About ¼" in diameter

EXAMPLE 5

Salt Spray Resistance of Coating Systems

The thinned compositions of Examples 1 and 2 are utilized as a topcoat over systems wherein zinc rich primers are used. Such systems are then tested in accordance with the procedure of Example 4 on sandblasted steel panels. Results after 3000 hours of salt spray are shown in Table II.

TABLE II

| SALT SPRAY ON SYSTEMS | |
| --- | --- |
| System | 3000 Hours Salt Spray |
| Example 1/Inorganic ethyl silicate zinc primer | NE |
| Example 2/Inorganic ethyl silicate zinc primer | Some tiny blisters |
| Example 1/Polyol silicate inorganic zinc primer | NE |
| Example 2/Polyol silicate inorganic zinc primer | 8 M |

Ratings of blisters according to ASTM
NE = No effect
8M = Medium blisters of #8 size

EXAMPLE 6

Immersion Exposure Testing

Sandblasted steel panels and wirebrushed rusty steel panels are topcoated at 5 mils dry film thickness with the thinned compositions of Examples 1 and 2. These panels are then immersed in fresh water or seawater for 6½ months.

Results of such testing are shown in Table III.

TABLE III

| FRESH WATER AND SEAWATER IMMERSION TESTING | | |
| --- | --- | --- |
| Composition | Sandblasted Steel | Rusty Steel |
| Fresh Water | | |
| Example 1 | NE | 6F |
| Example 2 | NE | 8M |
| Seawater | | |
| Example 1 | NE | NE |
| Example 2 | NE | 8F |

Key:
NE = No effect
6F = Size #6 blister - Few
8M = Size #8 blister - Medium

The foregoing testing from Examples 3-6 indicates that the coating compositions of the instant invention have improved pot life and provide better corrosion resistance characteristics in comparison with the similar coating composition of Morgan as described in U.S. Pat. No. 4,342,674.

EXAMPLE 7

Spot Testing of Chemical Resistance

Sandblasted steel panels coated with the thinned composition of Example 1 are tested for resistance to drops of various chemicals for a period of 24 hours. Results of such testing are shown in Table IV.

TABLE IV
RESULTS OF SPOT TESTING OF CHEMICAL RESISTANCE OF EXAMPLE 1 COMPOSITION

| | | |
|---|---|---|
| 1. | 5% NaOH | Surface softened |
| 2. | 5% $N_2SO_4$ | Surface softened |
| 3. | 5% Acetic Acid | Softened and blistered |
| 4. | 5% $NH_4OH$ | No effect |
| 5. | Unleaded gasoline | Slightly softened |
| 6. | Mineral Spirits | No effect |
| 7. | Hi Flash Naphtha | No effect |
| 8. | Ethanol | No effect |
| 9. | Methanol | No effect |
| 10. | Toluene | No effect |
| 11. | Methyl Ethyl Ketone | No effect |
| 12. | Cellosolve Acetate | Softened |

EXAMPLE 8

Room Temperature Stability

The two components of the Example 1 composition are allowed to stand at room temperature for six months. After this period no settling or deleafing is observed in Component A. There is soft settling of the solids of Component B, but the solids of Component B can be reincoporated to a homogenous state by agitation.

Although the present invention has been described with respect to its preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A two-component composition consisting essentially of a Component A and a Component B, said components intended for mixing in a volume ratio of from about 2:1 to 1:2 wherein:

the weight percent ranges and the ingredients in Componant A are:

| Ingredients | Wt. % |
|---|---|
| a diglycidyl ether of Bisphenol A having an epoxy equivalent weight of 185-192 | 50-80 |
| leafing aluminum paste comprising 68% of said flakes in 92 vol. % aliphatic hydrocarbon boiling at 150-175° C. and 8 vol. % aromatic hydrocarbon boiling at 150-175° C. | 25-35 |
| Coumarone-Indene Resin | 3-25 |
| Organic wax thixotropic agent | 0.1-2.0 |
| Silica gel moisture scavanger | 0.1-2.0 | the weight percent ranges and the ingredients in Component B are:

| Ingredients | Wt. % |
|---|---|
| Fatty acid resin is an amidoamine comprising the reaction product of an ethylenically unsaturated fatty acid and alkenyl polyamine | 30-45 |
| Fatty acid diamine salt is selected from N—tallow-1,3-propane diamine mono-octadecenoate and N—tallow-1,3-propane diamine dioctadecenoate | 3-6 |
| Coumarone-Indene Resin, softening point of about 50° F. | 3-25 |
| Organic wax thixotropic agent | 0.1-2 |
| Microcrystalline silica and magnesium silicate filler | 33-56 |
| Pigment selected from zinc phosphate and zinc chromate | 1-6 |
| Supplemental curing agent selected from dimethylamino-phenol and 2,4,6-tris(dimethylaminomethyl)phenol | 0.5-3. |

2. A coating composition according to claim 1, wherein the weight percent ranges for the ingredients in Component A are:

| Ingredient | Wt. % |
|---|---|
| Liquid Diglycidyl Ether of Bisphenol A | 55-70 |
| Organic Thixotropic Agent | 0.05-1 |
| Coumarone-Indene Resin | 4-10 |
| Leafing Aluminum Paste | 28-32 |
| Silica Gel | 0.5-1.5 | and the weight percent ranges for the ingredients in Component B are:

| Ingredient | Wt. % |
|---|---|
| Fatty acid amidoamine | 36-40 |
| Fatty acid diamine salt | 3.5-4.5 |
| Coumarone-Indene resin | 4-10 |
| Organic Thixotropic agent | 0.1-1 |
| Microcrystalline silica | 30-38 |
| Magnesium Silicate | 10-15 |
| Anticorrosive Pigment | 1.5-4.5 |
| Supplemental Curing Agent | 1-2 |

3. A composition ready for application to a rusty steel substrate containing about 40 volume % of Component A of claim 2, about 40 volume % of Component B of claim 2, and about 20 volume % of xylene.

* * * * *